United States Patent [19]

Elhaus

[11] 4,440,054
[45] Apr. 3, 1984

[54] TRAVELING SAW WITH A SOUND PROTECTION HOOD

[76] Inventor: Friedrich W. Elhaus, Dorfstrasse 21, 7761 Moos, Fed. Rep. of Germany

[21] Appl. No.: 306,225

[22] Filed: Sep. 28, 1981

[30] Foreign Application Priority Data

May 5, 1981 [DE] Fed. Rep. of Germany ....... 3117684

[51] Int. Cl.³ .................. B23Q 11/08; B23D 47/10
[52] U.S. Cl. ............................. 83/390; 83/397; 83/471.2; 83/478; 83/488; 83/544; 83/614; 83/701; 144/252 R
[58] Field of Search ............. 83/452, 488, 544, 471.2, 83/486, 486.1, 478, 614, 390, 397, 701; 144/252 R

[56] References Cited

U.S. PATENT DOCUMENTS

| | | | |
|---|---|---|---|
| 3,119,602 | 1/1964 | Johnson | 144/252 R |
| 3,747,457 | 8/1973 | Thompson | 83/471.2 |
| 4,036,093 | 7/1977 | Thorsell | 83/471.3 |
| 4,054,072 | 10/1977 | Jagers | 83/488 |
| 4,214,493 | 8/1980 | Elhaus | 83/100 |

*Primary Examiner*—Donald R. Schran

*Attorney, Agent, or Firm*—Willian, Brinks, Olds, Hofer, Gilson & Lione Ltd.

[57] ABSTRACT

A circular saw having a cantilever beam 12 which is adapted to be lifted and on which a sawing carriage including a saw blade 2 is guided for horizontal movement, comprises a sound protection hood 5 adapted to be lifted together with the cantilever beam 12. At its lower edge the sound protection hood 5 has a flexible crush-proof apron 49 which is made of a sound dampening flexible material and enters into sound-proof engagement with the table top 8 of the circular saw when the cantilever beam 12 with the sound protection hood 5 are lowered into the operating position. Hold down devices 40, 41, 42 mounted on the sound protection hood firmly hold the material 7 to be sawed on the table top 8 during the sawing process by means of strips 55, 72 which are of sound dampening material. The hold down devices are guided in parallel by a parallel guide means including racks and pinions so as to be biased "passively" with respect to the sound protection hood 5 by means of pneumatic cylinders 43. The measures described effectively prevent undesired sound projection, particularly from the noiseful sawing process.

11 Claims, 7 Drawing Figures

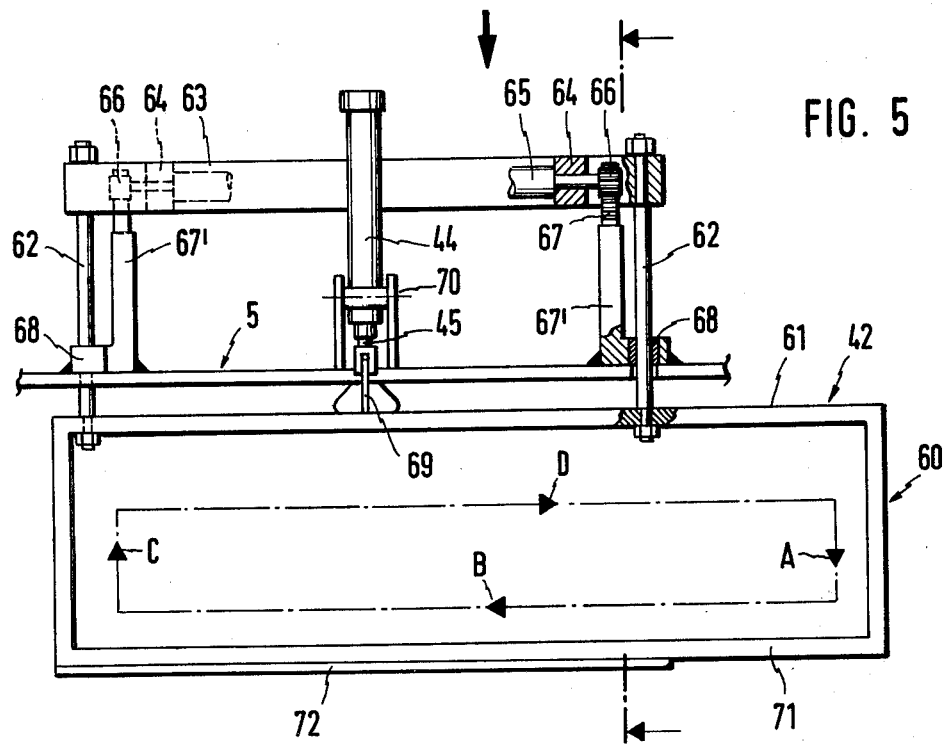
FIG. 5
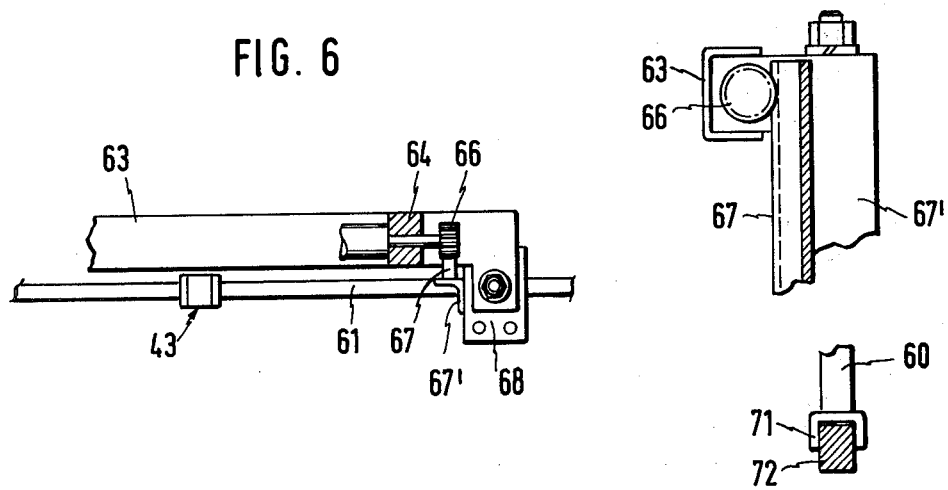
FIG. 6
FIG. 7

TRAVELING SAW WITH A SOUND PROTECTION HOOD

BACKGROUND OF THE INVENTION

The invention relates to a circular saw for sawing sectional material, in particular of light metal, the saw blade of which is adapted to be moved horizontally above a table at a carriage and to be lifted during each sawing cycle into a position above the material to be sawed for return of the saw blade, the carriage being displaceable along a horizontal guide means at a cantilever beam which is guided for lifting movement at a vertical column.

A known circular saw of this kind, characterized by simple and safe operation from the free end of the cantilever beam, permits sawing of wide sectional material stacks, for example extruded light metal sections. And the sawed sectional material can be carried off transversely of the direction of advance of the material to be sawed because of the single column structure (U.S. Pat. No. 4,214,493, filed Feb. 15, 1978 by Friedrich W. Elhaus).

Much noise is involved particularly when sawing extruded sectional material of alumium. Although the development of noise is reduced with the known circular saw in that no noise at all is created during the return movement of the saw blade which is lifted out of the sawing slot, still the noise exists which is developed as the saw blade advances, i.e. during the sawing cycle itself.

It is therefore, an object of the invention to provide a circular saw of the kind mentioned initailly with which the sawing noise is dampened.

SUMMARY OF THE INVENTION

To meet this object, it is provided in accordance with the invention, that a circular saw of the kind specified initially comprises a sound protection hood mounted on the cantilever beam and having at least one cut-out for the material to be sawed and being lowered against the table for sound protection in sawing position, and that upwardly displaceable hold down devices are arranged upon the sound protection hood which are of sound absorbing design and adapted for resilient engagement with the material to be sawed, for instance by means of pneumatic pressure fluid cylinders.

With the circular saw according to the invention the sound protection hood acting as a sound dampener which is lowered against the table during the sawing cycle, shields off the noise generated during sawing from the surroundings. A reduced amount of sound only can exist from the cut-out or cut-outs provided in the sound protection hood for supply of the sectional material to be cut. In a preferred embodiment with which a hold down device is disposed at each side of the sound protection hood in the range of the opposed cut-outs, the sound is effectively dampened in addition by the hold down devices resting on the material or a stack of profiles respectively to be sawed.

Conveniently the hold down devices are guided for movement by spaced paralled guide means of the sound protection hood, and preferably they are kept "passive", i.e. they are counter-held in their lowest position by a pressure fluid cylinder each associated with each hold down device, so as to be either flush with the lower edge of the sound protection hood or to rest on the stack of sectional material to be sawed, when in their highest position.

It is advantageous if each hold down device is guided for lifting movement by two spaced parallel guide means at the sound protection hood to make sure that it rests well on the stack of sectional material. Each of these parallel guide means may comprise an assembly including a rack and pinion.

Preferably, in addition to a hold down device at each side of the sound protection hood, a third hold down device is provided in the area between the two. This additional hold down device is formed by a frame offering free space at its inside for the horizontal and lifting movements of the saw blade.

BRIEF DESCRIPTION OF THE DRAWING

The invention will be described further, by way of example, with reference to the accompanying drawings, in which:

FIG. 5 is a view showing the structure of a hold down device disposed between the sides of the sound protection hood of the circular saw shown in FIGS. 3 and 4;

FIG. 6 is a partial top plan view of the structure according to FIG. 5 with parts shown in section;

FIG. 7 is a partial sectional view in the direction of the arrows VII—VII in FIG. 5 with parts broken away, not including the pressure fluid cylinder shown in FIG. 5.

DESCRIPTION OF PREFERRED EMBODIMENT

Figure 1:
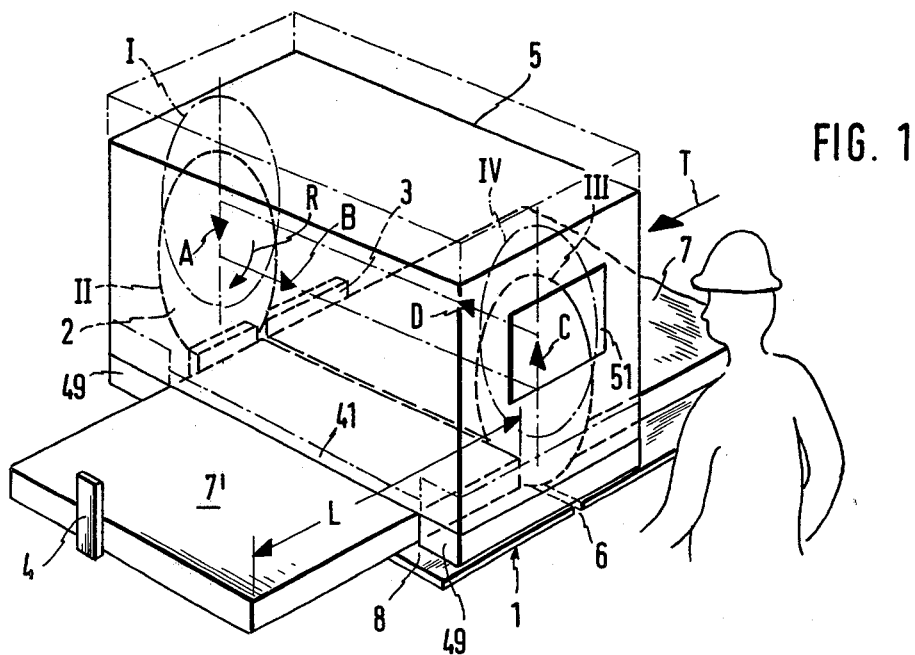
FIG. 1 is an operational diagram of a circular saw according to the invention, the operating position of the saw blade and sound protection hood of the circular saw being shown in discontinuous lines and the inoperative or return position in dash-dot lines, the hold down devices being left out.

Of the circular saw only the table 1, the saw blade 2 in four positions I, II, III, and IV, a longitudinal abutment member 3, a crosscut stop member 4, and a sound protection hood 5 are shown in the perspective diagrammatic view of FIG. 1. The saw blade 2 and the sound protection hood 5 are shown in discontinuous lines in their lowered operative position and in dash-dot lines in their raised inoperative or return position. Furthermore, a slot 6 is to be seen in tne table 1 into which the lower edge of the saw blade 2 enters during sawing. The material to be sawed in the form of a stack of light metal sectional material is marked by reference numeral 7.

With reference to FIG. 1 it will now be described how the novel circular saw is put to work:

Upon infeed of the material to be sawed, in the direction of arrow T, and aligning against the abutment member 3 and the stop member 4 the saw blade is caused to rotate in the direction of arrow R and lowered from the raised inoperative position I in the direction of arrow A into its operating position II. Subsequently it is moved in translatory sense in the direction of arrow B parallel to the table top 8. During its movement the saw blade 2 completely severs the material 7 to be sawed because the lower edge of the saw blade is disposed somewhat deeper than the underside of the material 7 to be sawed since it is immersed in the slot 6. The sawing process is continued until saw blade 2 has reached position III. Then the material 7 to be sawed is fully severed and, for instance, cut to a length L which is predetermined by the position of the adjustable cross cut stop member 4. Subsequently saw blade 2 is moved vertically upwards in the direction of arrow C into an elevated position IV, in which position the lower edge of the saw blade is free of the surface of the workpiece or material 7. At this height or elevation the saw blade 2 is again moved in translatory sense parallel to the table top from position IV in the direction of arrow D back into the starting or inoperative position I which is located beyond the longitudinal abutment member 3, as seen from the operator's place shown diagrammatically in FIG. 1. During this return motion the operator can remove the cut-off part 7' of the material to be sawed and align new material on the table 1 to be cut subsequently. It will be appreciated that the saw blade is fully covered by the sound protection hood 5 particularly during the return motion in the direction of arrow D so that optimum accident protection of the operator is obtained.

In the noisiest operating position the sound protection hood 5 is in sound dampening engagement with the table 1 by its lower edge which is designed as a flexible crush-proof apron 49, and it is only during the phases of motion A, C, D which are not very noisy, that it is lifted from the table 1. During all phases of motion A to D the operator can watch the saw blade 2 through a window 51 provided in the sound protection hood 5.

Figure 2:
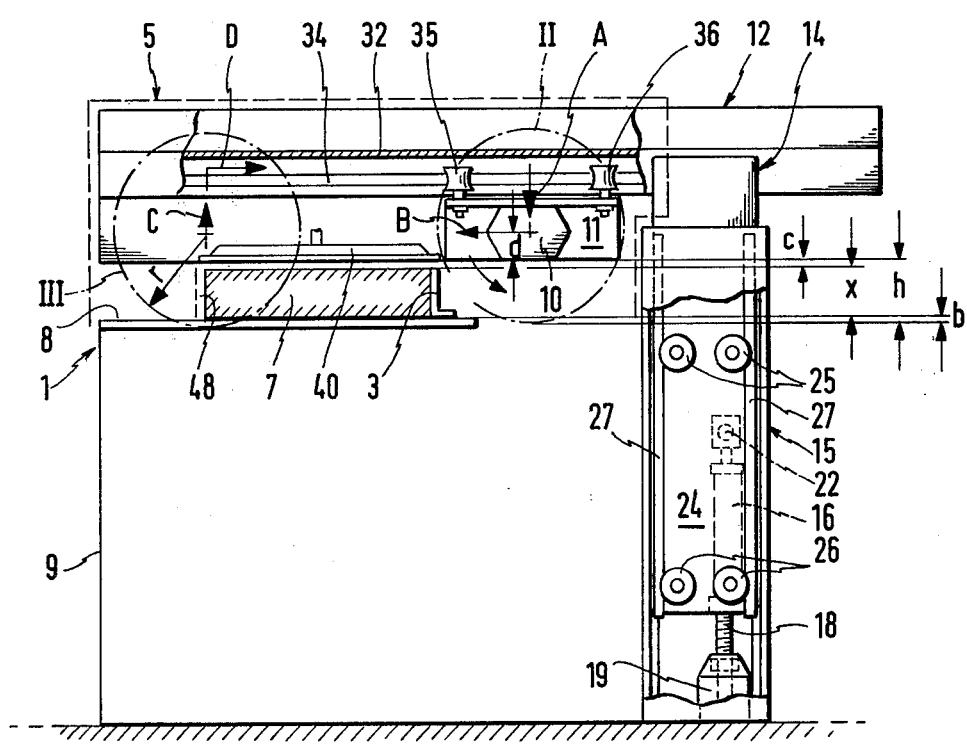
FIG. 2 is a side elevational view of a circular saw according to FIG. 1 with parts shown in section, a sound protection hood in accordance with the invention being indicated in discontinuous lines, and the fundamental structure of a circular saw being disclosed for realization of the saw blade movement shown in FIG. 1.

The embodiment described with reference to FIG. 2 is a preferred, particularly simple realization of the circular saw, the operation of which was explained with reference to FIG. 1. For the sake of simplicity the same reference numerals are used for corresponding elements.

Figure 3:
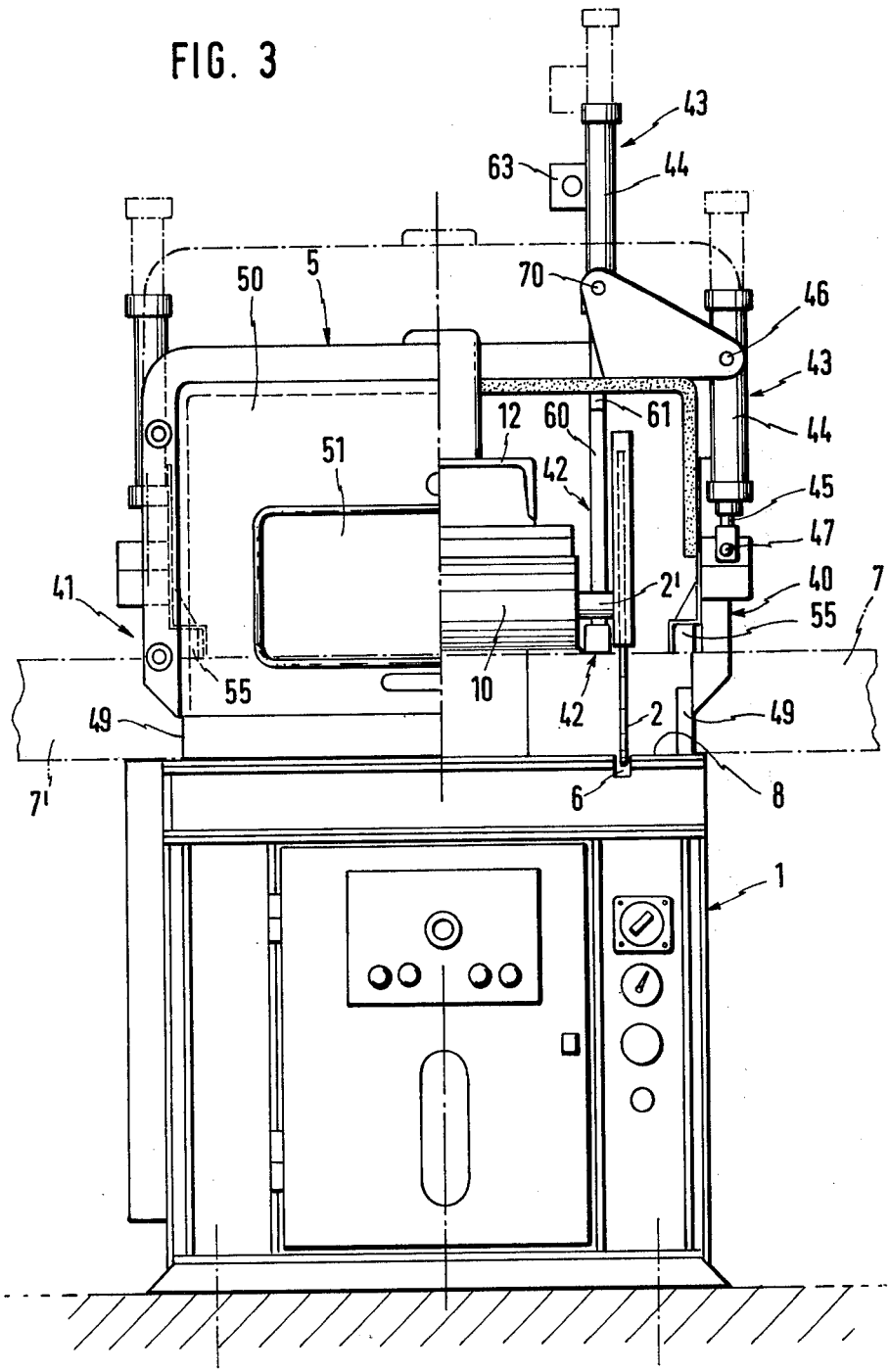
FIG. 3 is a front elevational view of a circular saw according to the invention with parts shown in section.
Figure 4:
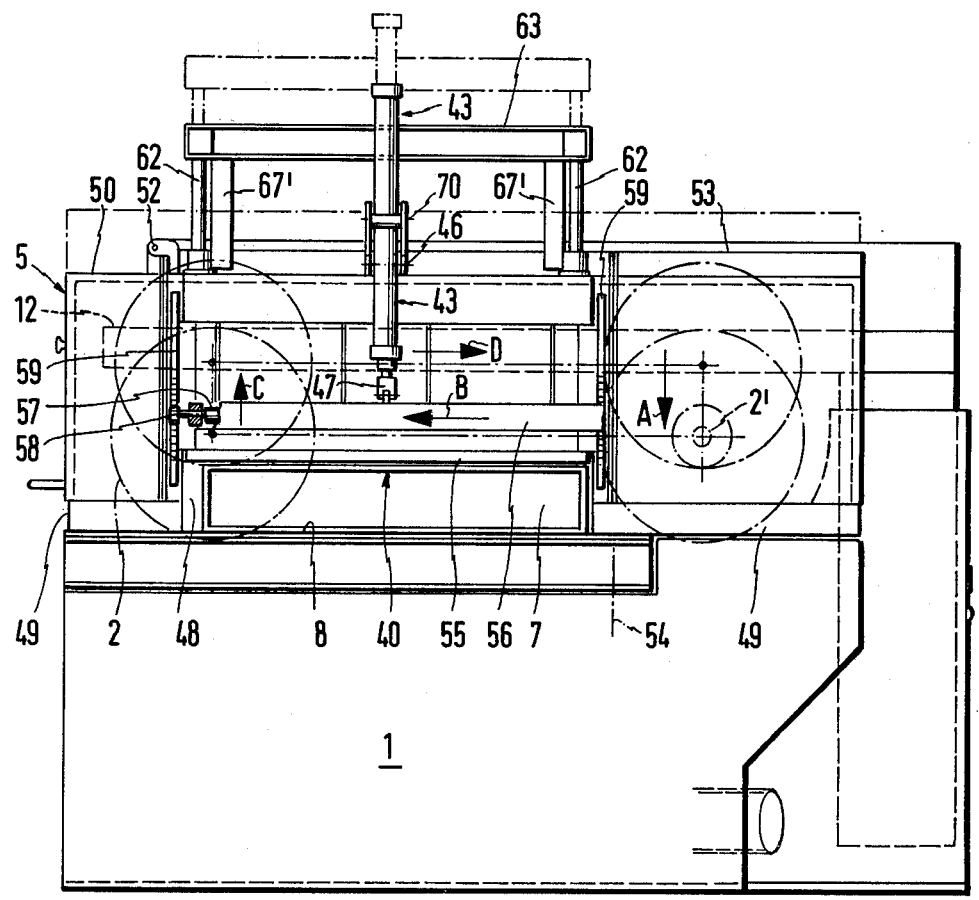
FIG. 4 is a side elevational view of the circular saw shown in FIG. 3.

The circular saw shown in FIGS. 2 through 4 has a table 1 with a table top 8 and a longitudinal slot 6, a saw blade 2 shown in its lowered positions II and III (operative position) and also being shown in discontinuous lines in FIG. 2 in the four positions I through IV, a longitudinal abutment member 3 for the material 7 to be sawed, and a sound protection hood 5 which is shown in discontinuous lines.

In FIG. 2 the place of the operator indicated in FIG. 1 is at the left side. It will be appreciated that the operator has free access to the table top 8 of the table 1 and to the material 7 to be sawed without being unnecessarily exposed to any danger from the saw blade 2 which is largely covered by the sound protection hood during operation as well. The good accessibility, among others, is afforded by the cantilever type structure of the saw support means which is open towards the operator's side and will be described in greater detail below.

It may be gathered from FIGS. 2 and 3 that the drive motor 10 of the saw blade is arranged coaxially with the saw blade and that the sawing unit composed of drive motor 10 and saw blade 2 is supported on a horizontally movable carriage 11. The stroke or height of lift by which the saw blade 2 is to be raised above the surface of the table results from the following equation:

$$h = x + c + b$$

wherein h = height of lift, x = maximum sawing depth (or thickness of the material being cut), c = a minor clearance of motion between the underside of the drive motor 10 and the surface of the material to be sawed, b = the depth of immersion of the saw blade 2 below the surface of the table.

The radius r of the saw blade 2 is determined according to the following equation:

$$r = h + d$$

wherein d = the motor radius in vertical, dowardly oriented direction.

The useful portion h of the saw blade radius r is maximized and much greater, for instance, than with a saw having its saw blade arranged under the table.

The circular saw shown in the figures comprises a horizontal cantilever beam 12 along which the carriage 11 is horizontally movable together with the sawing unit 2, 10. This permits the generation of the movements in the direction of the arrows B, D. The cantilever beam 12 is firmly connected to a column 14 which in turn is vertically displaceable in a support member 15. This permits generation of the movements of the saw blade in the direction of arrows A, C. In both cases pressure fluid cylinders are employed to produce the movements, one pressure fluid cylinder 16 generating the vertical movements and one pressure fluid cylinder 17 (FIGS. 3 and 4) generating the horizontal movements of the saw blade 2. The foot of the cylinder 16 is firmly connected to the spindle 18 of a worm drive 19 provided with a driving worm 20. Rotation of the worm 20 by means of a handwheel (not shown) permits adjustment of the basic level of the hydraulic cylinder 16 and thus of the column 14 to a desired value.

The sound protection hood 5 is firmly connected to the cantilever beam 12 and, therefore, accompanies the lifting movements of the same.

Roller pairs comprising upper rollers 25 and lower rollers 26 are rotatably supported at two different heights on legs 24 of column 14 which is embodied by an I-beam. The corresponding guide rails are formed by round 27 fixed at the inner sides of the support member 15. The rollers 25, 26 have rounded recesses to adapt them to the round rods 27.

Also cantilever beam 12 is made from sectional material and, for example, has a U-shaped profile 32 with its opening oriented downwards, round rods 34 being secured to the inner sides of said profile in the same manner as with the guide means of column 14. The rods 34 serve as rails for roller pairs comprising front rollers 35 and rear rollers 36 of carriage 11.

The guide structure described above is of simple design and permits wear-resistant, noiseless, and maintenance-free guidance of column 14 in support member 15 and of carriage 11 in cantilever beams 12.

The saw shown operates safely and with little noise as described with reference to FIG. 1. The sawing time is reduced by the time required for the return motion of the saw blade 2 from position III into position I because, during this period of time the operator can carry out other work, such as removing the material cut to final length and arranging new material to be cut so as to prepare the next sawing cycle.

FIGS. 3 through 7 show details of the sound dampening structure comprising the sound protection hood 5 and a total of three hold down devices 40, 41 and 42 arranged on the same. The hold down devices 40, 41 are disposed laterally with respect to the sound protection hood 5 (FIGS. 3 and 4), while the hold down device 42 is disposed in the range between the two sides of the sound protection hood 5, as best seen in FIG. 3.

A pneumatic cylinder 43 associated with each hold down device and has its cylinder body 44 fixed at the sound protection hood, for instance at 46 in the case of hold down device 40, and its piston rod 45 fixed at the corresponding hold down device, for instance at 47 in the case of hold down device 40.

The dimension of the hold down devices 40 and 41 in longitudinal direction is so selected that they correspond approximately to the length of aligned lateral cut-outs 48 formed in the lower edge of the sound protection hood 5. These cut-outs 48 serve for the introduction of the stack of material 7 to be sawed and for discharge of the sawed stack of material 7′. The cut-outs 48 are so dimensioned that the greatest thickness of the stack of material just fits into the same when the hold down devices 40, 41, 42 are in their fully raised position shown in FIG. 4. In the same manner the length of the cut-outs 48 is so selected that the greatest length of material to be severed by the saw fits into the same. Apart from these cut-outs 48 the entire lower edge of the sound protection hood 5 is formed by an apron 49 of flexible, crush-proof material, such as polyurethane plastic. In lowered condition of the sound protection hood 5 secured to the cantilever beam 12, the apron is in sound-proof engagement with the table top 8 of table 1.

That part 50 of the sound protection hood which faces the operator and comprises the window 51 is adapted to be tilted upwardly about a pivot axis 52 which is vertical with respect to the plane of the drawing, as seen in FIG. 4, so as to grant the operator access to the place of sawing.

The part 53 of the sound protection hood disposed behind the place of sawing may be adapted to be swung open about an axis parallel to the plane of the drawing, as seen in FIG. 4, indicated at 54.

The structure and guidance of the hold down devices 40 and 41 will be explained in more detail with reference to the hold down device 40 shown in side elevational view in FIG. 4. At its underside the hold down device 40 has a strip 55 of sound absorbing material, such as polyurethane plastic, approximately covering the length of the cut-out 48. This strip 55 is fixed to a transverse bar 56 in which a shaft 57 is supported. At both ends of the shaft projecting beyond the strip 55 a pinion each 58 is fixed for rotation. These pinions 58 are in meshing engagement with a rack 59 secured to the sound protection hood 5. The pneumatic cylinder 43 engages the bar 56 approximately in the middle of the length thereof at 47.

The arrangement of pinions 58 and racks 59 guarantees an exact parallel guidance of the hold down device 40 or 41 during its relative movement with respect to the sound protection hood 5.

The structure of the hold down device 42 comprises a frame 60 guided for vertical movement with respect to the hood 5 and having such dimensions that the path of the middle of the saw blade 2 of the saw shaft 2′ (FIG. 3) described with reference to FIGS. 1 and 2 can be comfortably described within the same, as indicated by arrows A through D.

The frame 60 is rectangular. At the upper leg 61 of the rectangle it carries two spaced guide columns 62 which are firmly connected to each other by an upper transverse bar 63. The transverse bar 63 carries bearings 64 which rotatably support a shaft 65. At both its ends projecting beyond the bearings 64 this shaft carries a pinion 66 each. Each pinion 66 is in meshing engagement with a corresponding rack 67 carried by a strut 67′ which extends upwardly from the top wall of the sound protection hood 5.

At its lower end the strut 67′ carries a sliding guide bearing 68 for the corresponding column 62.

The piston rod 45 of the corresponding pneumatic cylinder 43 engages the upper leg 61 of frame 60 between the two columns 62, whereas the cylinder body 44 is secured to the sound protection hood 5 at 70.

As shown in FIG. 7, the lower leg 71 of frame 60 is provided with a strip 72 of sound absorbing material, such as polyurethane plastics, extending approximately accross the length of the cut-out 48.

The front elevational view of FIG. 3 also shows the control unit provided at the front side of the table 1 and comprising a single button for actuation.

During operation the sound dampening structure comprising the sound protection hood 5 and the hold down devices 40, 41, 42 is moved as follows:

When the command "sawing start" is given, a follower circuit provided in a control unit (not shown) of the saw is actuated. This causes lowering of the cantilever beam 12 and of the sound protection hood 5 secured to the same. The apron 49 of the sound protection hood 5 is moved against the table top 8 and seals the inner space of the saw from the surroundings. In the starting position the strips 55, 72 of the hold down devices 40, 41, 42 were in their lower-most position at the level of the lower edge of the apron 49. As the sound protection hood 5 is moved downwardly, the strips 55, 72 come to rest on the stack of profiles to be sawed 7 and are held back on the same with respect to the sound protection hood 5 so that the hold down devices are pushed upwardly "passively" with respect to the hood. Thus the cylinders 43, which preferably are pneumatic cylinders, are not actuated actively but instead only indirectly by movement of the sound protection hood. in that they restrain the hold down devices against the hood movement.

Subsequently the sawing step will take place in the direction of arrow B.

The movement described of the sound protection hood 5 and of the strips 55, 72 of the hold down devices is effected in contrary sense as the cantilever beam 12 is raised (arrow C).

With the saw described sound can exit towards the outside to a very limited extent only through the opening which remains between the stack of sectional material 7 and the cut-out 48. This affords a decisive noise abatement during sawing.

Though the above-described embodiments are preferred, many other modifications and refinements which do not depart from the true spirit and scope of the invention may be conceived by those of ordinary skill in the art. It is intended that all such modifications and refinements be covered by the following claims.

What we claim is:

1. An improved circular saw for sawing sectional material, particularly of light metal, of the type wherein the saw blade is adapted to be moved horizontally above a table upon a carriage and to be lifted during each sawing cycle into a position above the material to be sawed for return of the saw blade, the carriage being displaceable along a horizontal guide means upon a cantilever beam which is guided for lifting movement upon a vertical column, the improvement comprising:

a sound protection hood mounted on the cantilever beam, and substantially covering the saw blade during the horizontal and vertical movements of the saw blade, said hood having at least one cut-out for the material to be sawed and being lowered against the table for sound dampening in the sawing position; and upwardly displaceable hold down devices arranged upon the sound protection hood, said hold down devices being designed so as to be sound absorbing and resiliently engageable with the material to be sawed.

2. The circular saw of claim 1 wherein each said hold down device is guided for upward displacement with respect to the sound protection hood by two spaced parallel guide means.

3. The circular saw of claim 2 wherein each parallel guide means oomprises an assembly including a rack and pinion.

4. The circular saw of claim 1 or 2 further comprising a pressure fluid cylinder associated with each hold down device, the cylinder body of said pressure fluid cylinder being fixed to the sound protection hood and the piston rod being fixed to the hold down device.

5. The circular saw of claim 1 or 2 wherein a strip of sound absorbing material is provided on the active side of each hold down device, said active side being the side that engages the material to be sawed.

6. The circular saw of claim 1 wherein the sound protection hood contains two cut-outs for the material to be sawed and one hold down device is provided at each outer wall of the sound protection hood in the area of each of the two opposed cut-outs and a third hold down device is provided in the area between the sides of the sound protection hood adjacent the horizontal path of the saw blade.

7. The circular saw of claim 6 wherein said third hold down device in the area between the sides of the sound protection hood is formed by a frame that provides free space at its inside to accommodate the horizontal and lifting movements of the saw blade.

8. The circular saw of claim 1 wherein the sound protection hood comprises two opposed cut-outs at both its lower side edges for the sectional material or stacks of sectional material to be sawed, and wherein the length of the hold down devices corresponds approximately to the length of said cut-outs.

9. The circular saw of claim 1 or 8 wherein the sound protection hood comprises at its lower edges a flexible crush-proof apron of sound absorbing plactic.

10. The circular saw of claim 4 wherein said pressure fluid cylinders are biased such that they tend to passively keep the hold down devices in the lowest position in which they are flush with the lower edge of the sound protection hood.

11. A circular saw for sawing generally flat material comprising:

a substantially horizontal table upon which said material is placed for sawing;

a substantially vertical column adjacent said table;

a substantially horizontal cantilever beam guided upon said column for vertical movement therealong;

a carriage guideably mounted upon said cantilever beam for horizontal movement therealong;

a saw blade rotatably mounted upon said carriage so as to be moveable horizontally along said table during each sawing stroke and moveable horizontally above said material during each return stroke;

a sound protection hood mounted upon said cantilever beam so as to substantially cover said saw blade during the horizontal movements of the saw blade and to engage said table for sound dampening during said sawing stroke, and having at least one cutout for said material;

and, at least one upwardly displaceable hold down device mounted upon said sound protection hood so as to be biased downward against said material and designed to be sound absorbing.

* * * * *